Figure 1A:
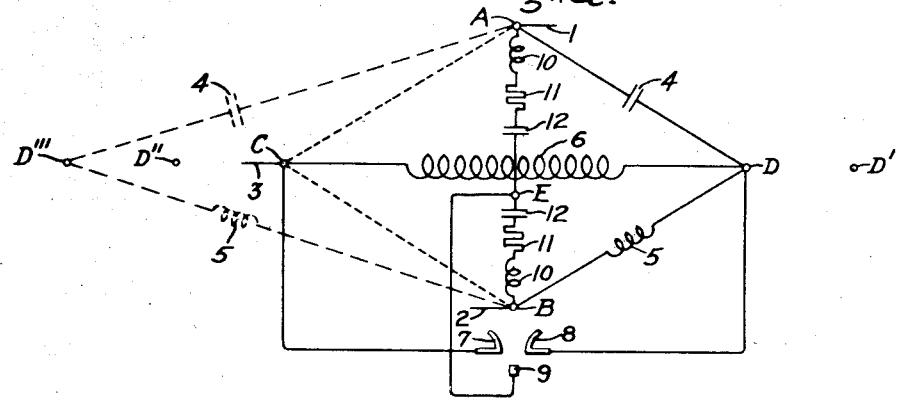

Feb. 27, 1940.   B. D. BEDFORD   2,192,028

PROTECTIVE SYSTEM

Filed Oct. 16, 1937

Inventor:
Burnice D. Bedford,
by Harry E. Dunham
His Attorney.

Patented Feb. 27, 1940

2,192,028

UNITED STATES PATENT OFFICE 2,192,028

PROTECTIVE SYSTEM

Burnice D. Bedford, Schenectady, N. Y., assignor to General Electric Company, a corporation of New York Application October 16, 1937, Serial No. 169,498

5 Claims. (Cl. 171—119)

My invention relates to protective systems, and more particularly to protective systems for electric apparatus of the variable voltage output type.

Heretofore there have been devised numerous arrangements for protecting variable output voltage apparatus. For example, in the protection of apparatus arranged to maintain a constant current output, over-voltage protective apparatus has been connected across the output circuit to limit the voltage thereof when the resistance or impedance of the load circuit increased above a value corresponding to a predetermined safe output voltage.

In electric power transmission distribution systems, such as that disclosed and claimed in U. S. Patent No. 1,990,758, granted February 12, 1935, upon an application of C. W. Stone, and assigned to the assignee of the present application, there has been evidenced a decided need for protective apparatus to limit the constant current voltage and, hence, limit the voltages impressed on the various elements of the monocyclic network which effects a transformation of constant voltage alternating current to alternating current of constant value.

It is an object of my invention to provide a new and improved electric protective system.

It is another object of my invention to provide a new and improved protective system for electric apparatus having a variable output voltage characteristic.

It is a further object of my invention to provide a new and improved protective system for constant current alternating current apparatus.

It is a still further object of my invention to provide a new and improved protective system for electric power transmission and distribution systems of the type employing monocyclic networks for effecting transformation of constant voltage alternating current to alternating current of constant value.

In accordance with the illustrated embodiments of my invention, I provide a protective system for limiting the output voltage of a variable output voltage apparatus such as a monocyclic network employing reactances of opposite sign connected to transform constant voltage alternating current to alternating current of constant value, or vice versa. Over-voltage protective apparatus such as arc gaps are connected across the constant current or variable voltage terminals to limit the voltage thereof and, hence, to limit the voltages impressed on the elements of the monocyclic network. In order to effect this protection prior to the application of overvoltages to the elements of the monocyclic network, I provide means such as an auxiliary electrode placed in the vicinity of main electrodes of the arc gap to initiate the establishment of an arc discharge. The auxiliary electrode is connected to a point of reference potential established by an electrical network which is energized from constant voltage terminals of the monocyclic network. The reference potential is intermediate the limits of the normal operating range of voltages of the constant current circuit, and when the constant current voltage exceeds a predetermined value the auxiliary electrode initiates an arc discharge between one of the main electrodes and the auxiliary electrode which in turn ignites the main arc discharge path to limit the constant current voltage and hence limits the voltages impressed on the elements of the monocyclic network.

Figure 2:
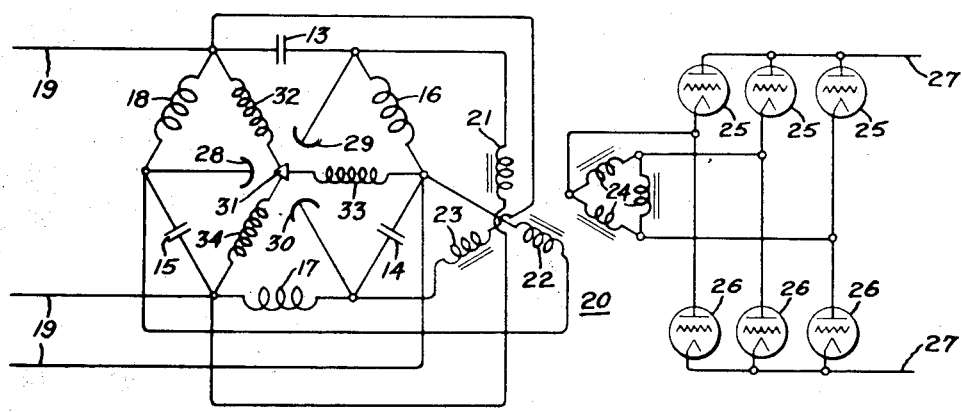
Figure 1:
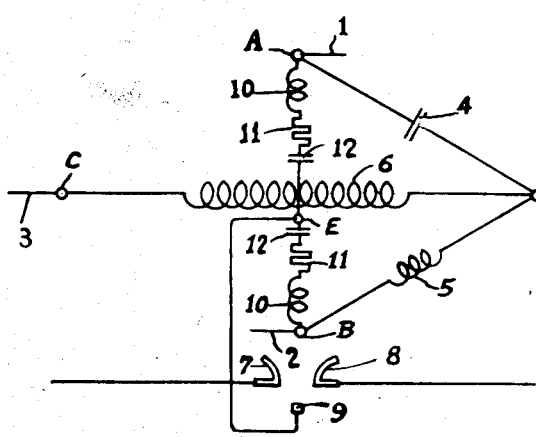

For a better understanding of my invention, reference may be had to the following description taken in connection with the accompanying drawing and its scope will be pointed out in the appended claims. Fig. 1 of the accompanying drawing diagrammatically illustrates my invention as applied to a monocyclic network for transforming constant voltage alternating current to alternating current of constant value. Fig. 1a represents certain operating characteristics of the circuit shown in Fig. 1. Fig. 2 illustrates my invention as applied to an electric transmission system.

Referring now to Fig. 1 of the accompanying drawing, my invention is diagrammatically illustrated as applied to monocyclic network for effecting transmission of constant voltage alternating current to alternating current of constant value connected to a polyphase constant voltage alternating current circuit including conductors 1, 2 and 3. The monocyclic network, of course, may be polyphase and includes a plurality of branches, but in order to facilitate description and operation of my invention I have chosen to show only one branch of the monocyclic network including serially connected reactances of opposite sign, such as a capacitance 4 and an inductance 5 having a common juncture D. Conductors 1, 2 and 3 may be considered as being connected to points A, B and C of the monocyclic network. The constant current circuit of the monocyclic network for capacitance 4 and inductance 5 is connected between points C and D. That is, one terminal thereof is connected to point C of the constant voltage alternating current circuit, and the other terminal thereof is connected to point D which is a point of variable potential which maintains in circuit 6 an alternating current of constant value. This circuit is disclosed and broadly claimed in my copending application, Serial No. 97,011, filed August 20, 1936, and assigned to the assignee of the present application.

In order to limit the voltage impressed on the constant current alternating current circuit 6, I connect across the terminals thereof a suitable voltage protective or limiting arrangement which may be an arc gap or horn gap assembly including main electrodes 7 and 8. To initiate the establishment of the arc discharge between the main electrodes 7 and 8 in accordance with an electrical condition of the monocyclic network, or in accordance with an electrical condition of one of the associated circuits, I provide an auxiliary electrode 9 which is placed in the vicinity of the main electrodes 7 and 8 to initiate the establishment of the main arc discharge. As an agency for impressing between the auxiliary electrode 9 and one of the main electrodes, such as electrode 8, a voltage which varies in accordance with the constant current voltage of the monocyclic network and, hence, in accordance with the voltages impressed across the capacitance 4 and inductance 5, I provide an electric circuit of relatively high impedance which may include inductances 10, resistances 11 and capacitances 12 to establish a point E of reference potential. The potential of point E remains constant since the circuit including inductances 10, resistances 11 and capacitances 12 is connected across the constant voltage alternating current conductors 1 and 2. The potential of the point E is chosen to be within the normal operating range of voltages of the constant current circuit.

The operation of the embodiment of my invention diagrammatically illustrated in Fig. 1 will be explained by referring to Fig. 1a and by considering the system when the monocyclic network is operating to transform constant voltage alternating current to alternating current of constant value in a system of the type disclosed and claimed in the above-identified patent of C. W. Stone. As will be well understood by those skilled in the art, the potential of the point D will vary due to the operation of the capacitance 4 and the inductance 5 to maintain constant the current supplied to the alternating current circuit from the constant voltage circuit including conductors 1, 2 and 3. Of course, the other two branches of the monocyclic network (not shown) will be required to maintain this condition in the other phases of a polyphase system. Under transient conditions of the transmission system occasioned by open circuit of the constant current direct current transmission system, or due to failure of associated electronic discharge apparatus, the potential of the point D varies appreciably and may assume potentials corresponding to the positions of points D', D'' and D'''. When the potential of the point D moves to the position D''', it is noted that while the voltage appearing across the constant current circuit 6 is only that corresponding to the displacement between point C and point D''', there are materially greater voltages impressed across capacitance 4 and inductance 5 corresponding to the displacement between points A and D''' and B and D''', respectively. It is, therefore, to be understood that the main electrodes 7 and 8, while acting alone, limit the voltage of the constant current circuit 6 but do not limit the voltages impressed on the elements of the monocyclic network until the voltages thereof are several times greater than the safe operating voltages. Due to the auxiliary electrode 9, which is energized in accordance with the potential appearing between point E and the main electrode 8 which is connected to the point D of variable potential, when the difference in potential between points D and E exceeds a predetermined value, the auxiliary electrode 9 acts in conjunction with the main electrode 8 to establish an arc discharge which initiates the establishment of an arc discharge between the main electrodes 7 and 8 to limit the voltage of the constant current circuit. The protective system may be arranged so that the arc discharge is initiated when the potential of the point D exceeds that established by the range of potentials between point D' and point D'', in this way establishing a safe limit to the voltages impressed across capacitance 4 and inductance 5.

While I have explained the embodiment of my invention in Fig. 1 as applied to a system in which energy is being transformed from constant voltage alternating current to alternating current of constant value, it is to be understood that my invention applies equally well to a monocyclic system in which alternating current of constant value is transformed into alternating current of constant voltage, in which case the potential variations of the point D will move considerably to the right instead of to the left. Although the necessity for the protection of the elements of the monocyclic network under such a condition of operation is not as great as that explained above, there is need for an arrangement to limit the voltages impressed on the capacitance 4 and inductance 5, and the arrangement shown in Fig. 1 affords this protection.

Referring now to Fig. 2, I have shown my invention diagrammatically as applied to an electric transmission system of the type disclosed and claimed in the above-mentioned patent of C. W. Stone. A monocyclic network including serially connected reactances of opposite sign such as capacitances 13, 14 and 15, associated respectively with inductances 16, 17 and 18, are employed to transform constant voltage alternating current derived from circuit 19 to alternating current of constant value. The constant current output circuits are connected in the manner disclosed and claimed in my above-identified copending patent application and include primary windings 21, 22 and 23 of transformer 20. The transformer 20 also includes secondary windings 24 which supplies alternating current of constant value to groups of electric valves 25 and 26 which transform the alternating current of constant value to direct current of constant value and supply it to the transmission line 27.

Voltage protective and limiting means such as arcing electrodes 28, 29 and 30 are connected to the juncture points of the reactances of opposite voltage conductors 19. The arcing electrodes 28—30 are placed in proximity in order that an arc discharge may be maintained between any two of them, or among all of them. The auxiliary electrode 31 is placed in the vicinity of the main arcing electrodes 28—30 to initiate the establishment of an arc discharge in accordance with the deviation from a reference potential established by a high impedance network including inductances 32, 33 and 34 which are connected to the constant voltage conductors 19. In the arrangement of Fig. 2 the main electrodes are connected across points of variable potential or, in other words, are connected across the variable output terminals of the monocyclic network.

The operation of the embodiment of my invention shown in Fig. 2 is substantially the same as that explained in connection with the arrangement of Fig. 1. Let it be assumed that the system is operating to transmit direct current of constant value to transmission circuit 27. The monocyclic network transforms the constant voltage alternating current to alternating current of constant value and the groups of electric valves 25 and 26 transform the alternating current of constant value to direct current of constant value. In the event the resistance of the transmission line 27 becomes excessively large, or in the event the transmission line becomes open circuited, the output voltage of the monocyclic network will accordingly respond in an effort to maintain the output current thereof at a substantially constant value. Accordingly, the potentials impressed on the main arcing electrodes 28—30 will also increase, and the difference in potential between these electrodes and the auxiliary electrode 31 will also increase. At the value of potential difference at which the system is adjusted, the auxiliary electrode 31 will initiate an arc discharge between itself and one or more of the main electrodes which in turn will establish discharges between the main electrodes to short circuit the respective constant current circuits of the monocyclic network to limit the voltages thereof, thereby limiting the voltages impressed on the elements of the monocyclic network.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a monocyclic network for transforming constant voltage alternating current to alternating current of constant value comprising a pair of serially connected reactances of opposite sign and having a constant current circuit, protective means connected across terminals of the constant current circuit to limit the voltages appearing across said reactances, an electric circuit for establishing a point of reference potential, and means responsive to the potential difference between said point and a point of said monocyclic network having a potential indicative of the voltage across the individual reactances to initiate the operation of said protective means.

2. In combination, a monocyclic network comprising serially connected reactances of opposite sign for transforming constant voltage alternating current to alternating current of constant value and having a constant current circuit, an arc gap comprising a pair of main electrodes connected across the constant current circuit of said monocyclic network to limit the voltages appearing across said reactances, an electric circuit for establishing a point of reference potential, and means including an electrode intermediate the main electrodes and being responsive to the difference in potential between said point and a point of said monocyclic network having a potential indicative of the voltage across the individual reactances for initiating breakdown of the main arc gap when the constant current voltage exceeds a predetermined operating range.

3. In combination, a constant voltage alternating current circuit, a constant current alternating current circuit, means interconnected between said circuits including serially connected reactances of opposite sign for transforming constant voltage alternating current to alternating current of constant value, said constant current circuit being connected across one conductor of the constant voltage circuit and a common juncture of reactances of opposite sign, protective means connected across the constant current circuit for limiting the voltages appearing across said reactances, an electric circuit connected across said constant voltage circuit for establishing a point of reference potential relative to the potential variations of said reactances within the normal voltage operating range of said constant current circuit, and means responsive to the difference in potential of said point and said common juncture to initiate the operation of said protective means.

4. In combination, a constant voltage alternating current circuit, a constant current alternating current circuit, a monocyclic network including serially connected reactances of opposite sign for transforming constant voltage alternating current to alternating current of constant value, a main arc discharge device including a pair of main electrodes connected across said constant current circuit, an electric circuit connected to said constant voltage alternating current circuit for establishing a point of constant reference potential for said reactances and intermediate the normal range of variation of the constant current voltage of said monocyclic network, and an ignition electrode in the vicinity of said main electrodes and being connected to said point of reference potential to initiate the establishment of an arc discharge between said main electrodes when the potential difference between said point and a variable potential point of said monocyclic network exceeds a predetermined value to limit the voltages appearing across said reactances.

5. In combination, a constant voltage alternating current circuit, a constant current alternating current circuit, a monocyclic network interconnecting said circuits and comprising a plurality of branches each including serially connected reactances of opposite sign, alternate junctures of said reactances of opposite sign being connected to said constant voltage alternating current circuit, a plurality of arcing electrodes connected to the junctures of said reactances of opposite sign other than those first mentioned, an electric circuit connected to said constant voltage alternating current circuit for establishing a point of constant reference potential for said reactances within the normal range of operation of the constant current voltage of said monocyclic network and an ignition electrode in the vicinity of said arcing electrodes and being connected to said point of reference potential to initiate the establishment of an arc discharge between said arcing electrodes when the potential difference between said point and a variable potential point of said monocyclic network exceeds a predetermined value to limit the voltages appearing across said reactances.

BURNICE D. BEDFORD.

CERTIFICATE OF CORRECTION.

Patent No. 2,192,028. February 27, 1940.

BURNICE D. BEDFORD.

It is hereby certified that error appears in the printed specification of the above numbered patent requiring correction as follows: Page 2, second column, line 62, after "opposite" insert sign, which are not connected to the constant; and that the said Letters Patent should be read with this correction therein that the same may conform to the record of the case in the Patent Office.

Signed and sealed this 2nd day of April, A. D. 1940.

(Seal)

Henry Van Arsdale,
Acting Commissioner of Patents.